US011027521B2

(12) United States Patent
Duval

(10) Patent No.: US 11,027,521 B2
(45) Date of Patent: Jun. 8, 2021

(54) SPLICE JOINT IN LAMINATE COMPOSITE STRUCTURE

(71) Applicant: Bell Helicopter Textron Inc., Fort Worth, TX (US)

(72) Inventor: Sebastien Duval, Terrebonne (CA)

(73) Assignee: Textron Innovations Inc., Providence, RI (US)

( * ) Notice: Subject to any disclaimer, the term of this patent is extended or adjusted under 35 U.S.C. 154(b) by 8 days.

(21) Appl. No.: 16/004,371

(22) Filed: Jun. 9, 2018

(65) Prior Publication Data

US 2019/0375190 A1 Dec. 12, 2019

(51) Int. Cl.

| | |
|---|---|
| ***B32B 5/26*** | (2006.01) |
| ***B32B 7/03*** | (2019.01) |
| ***B32B 27/08*** | (2006.01) |
| ***B29C 70/38*** | (2006.01) |
| *B29K 105/08* | (2006.01) |
| *B29L 31/30* | (2006.01) |

(52) U.S. Cl.

CPC .............. *B32B 7/03* (2019.01); *B29C 70/382* (2013.01); *B32B 27/08* (2013.01); *B29K 2105/0881* (2013.01); *B29L 2031/3076* (2013.01); *B32B 5/26* (2013.01); *B32B 2605/18* (2013.01)

(58) Field of Classification Search

CPC ............. Y10T 428/192; Y10T 428/197; B29C 66/721; B29C 66/723; B29C 66/12241; B29C 66/1228; B29C 66/12281; B32B 5/26

See application file for complete search history.

(56) References Cited

U.S. PATENT DOCUMENTS

| | | | | |
|---|---|---|---|---|
| 9,278,484 | B2 * | 3/2016 | Guzman | B29C 70/207 |
| 9,731,453 | B2 * | 8/2017 | Humfeld | B29C 65/02 |
| 2009/0148647 | A1 * | 6/2009 | Jones | B29C 70/30 428/58 |

OTHER PUBLICATIONS

Canadian Exam Report in related Canadian Patent Application No. 3,044,580 dated Aug. 5, 2020, 4 pages.
Canadian Exam Report in related Canadian Patent Application No. 3,044,580 dated Feb. 5, 2021, 4 pages.

* cited by examiner

*Primary Examiner* — Alexander S Thomas
(74) *Attorney, Agent, or Firm* — Lightfoot & Alford PLLC

(57) ABSTRACT

Layers of plies of composite material are laid on a convex tool surface. A first layer is placed with a first ply of a first section having a gap edge adjacent a gap edge of a first ply of a second section, the edges being parallel and a contraction distance from each other. A second layer is placed with a second ply of the first section having a gap edge adjacent a gap edge of a second ply of the second section, the edges being parallel and a contraction distance from each other, the second ply of the second section overlapping onto the first ply of the first section by a splice distance. Consolidation and curing cause contraction of the layers toward the tool, allowing the adjacent gap edges of each layer to be in close proximity or in contact after moving toward each other during the contraction.

20 Claims, 8 Drawing Sheets

C
C
B
A
201
203 205 213 211 231 225 210 212

SPLICE JOINT IN LAMINATE COMPOSITE STRUCTURE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Composite laminate structures are formed from a plurality of plies of fibers and a matrix material. The fibers of the plies may be generally parallel, as in unidirectional tape, or at angles to each other, as in woven mats or chopped fiber applications. The matrix material of the plies may be impregnated before placement, known as "prepreg," applied manually, such as by brushing, or injected into a mold containing placed fibers.

Prepreg plies are produced with a selected volume of matrix material, and uncured-ply thickness is larger than the cured-ply thickness due to the change in volume or redistribution of matrix material during consolidation and curing. Excess matrix material may escape from the plies during consolidation, such as during vacuum bagging of the structure.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The splice joints and methods of forming splice joints disclosed herein are used to join plies of sections of an uncured composite structure prior to curing. The embodiments of this method are useful for minimizing wrinkles or voids in a cured laminate composite, which may be formed from unidirectional tape laid by an automated fiber-placement (AFP) machine, on a tool with a convex surface. The joint and method are especially useful with tools having a closed-shape cross section, such as, for example, a mandrel on which plies are laid for forming a hollow structure. The figures are simplified, schematic views, used for illustration only, and are not to scale.

Figure 1:
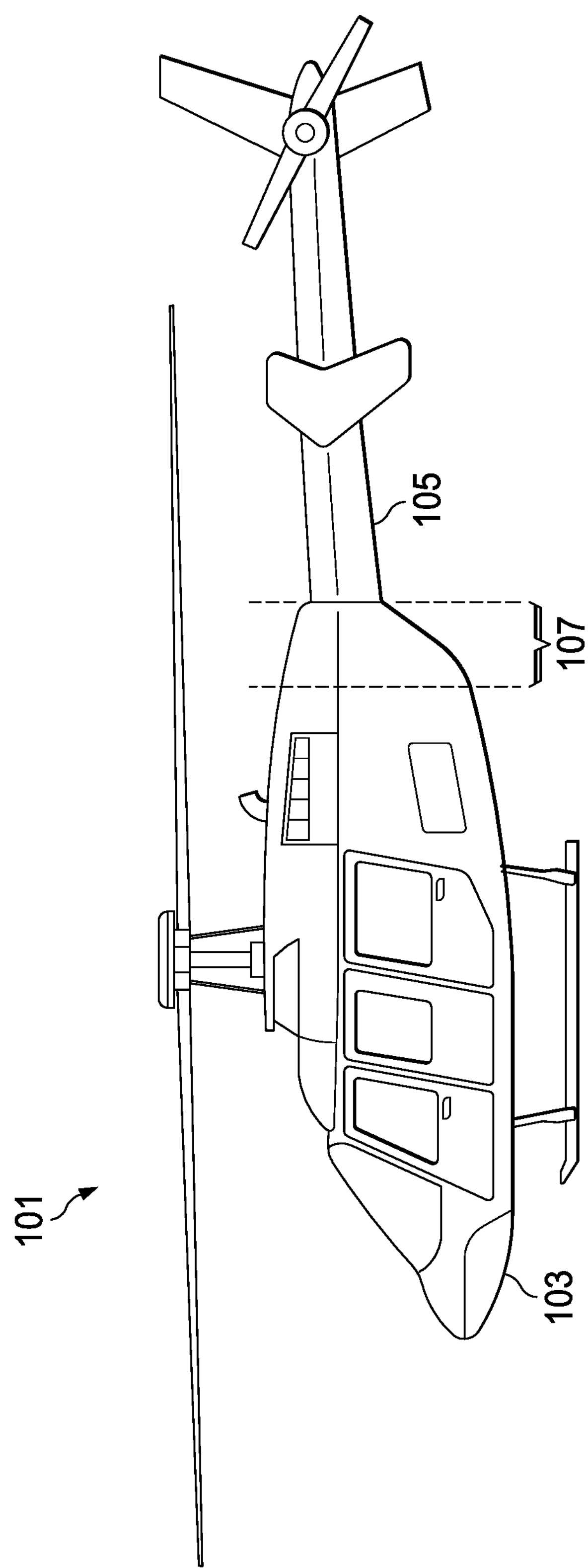
FIG. 1 is a side view of an aircraft having a structure formed using a method according to this disclosure.

FIG. 1 illustrates a helicopter 101, comprising a fuselage 103 and a tailboom 105 extending rearward from fuselage 103. Fuselage 103 and tailboom 105 are typically formed as laminate composite structures, in which AFP machines lay prepreg unidirectional tape on a closed-shape tool in selected ply directions to achieve the strength required for the application. In helicopter 101, fuselage 103 and tailboom 105 are formed as separate structures and typically joined together with fasteners after curing. Because of the complex shape with small radii, splice joints are preferably used in at least transition region 107 and may be used on any closed shape, such as the remainder of fuselage 103 or tailboom 105.

Prepreg ply thickness varies before and after curing due to the matrix material content and location. During part consolidation and curing, the matrix material may escape from around the fibers of each ply and flow between and around the fibers of other plies to consolidate the part. During this reaction, the plies will shrink, and the fibers will move relative to adjacent fibers and/or adjacent layers of plies. The plies move inward toward the tool as the thickness of each underlying ply decreases. This can be especially problematic when manufacturing a closed-shape part (e.g., cylinder, rectangular box, etc.) on a male tool when there is no "free edge" for the material to allow fiber displacement during part consolidation and cure. On thick laminates (6 plies or more) with a small tool radius, this can cause wrinkles, which are undesirable due to stress concentrations at the fiber discontinuities. Laminates with more plies would make it even less likely that fibers would be able to move during consolidation and curing.

Figure 2:
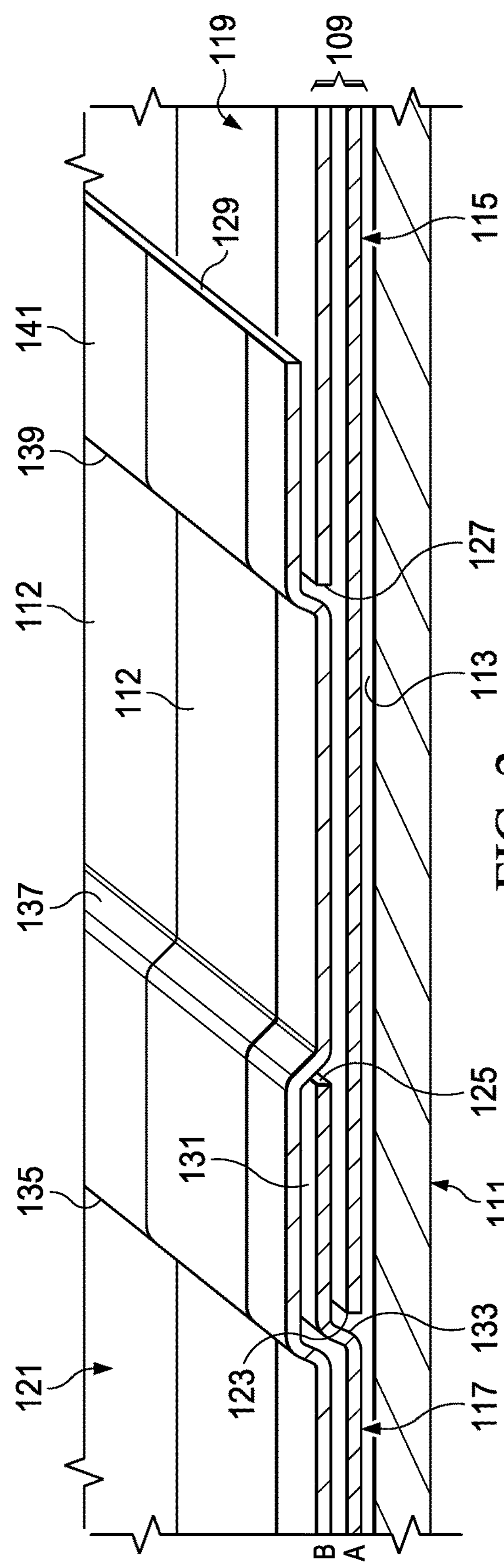
FIG. 2 is a cross-section oblique side view of an uncured splice joint formed using a prior art method.
Figure 3:
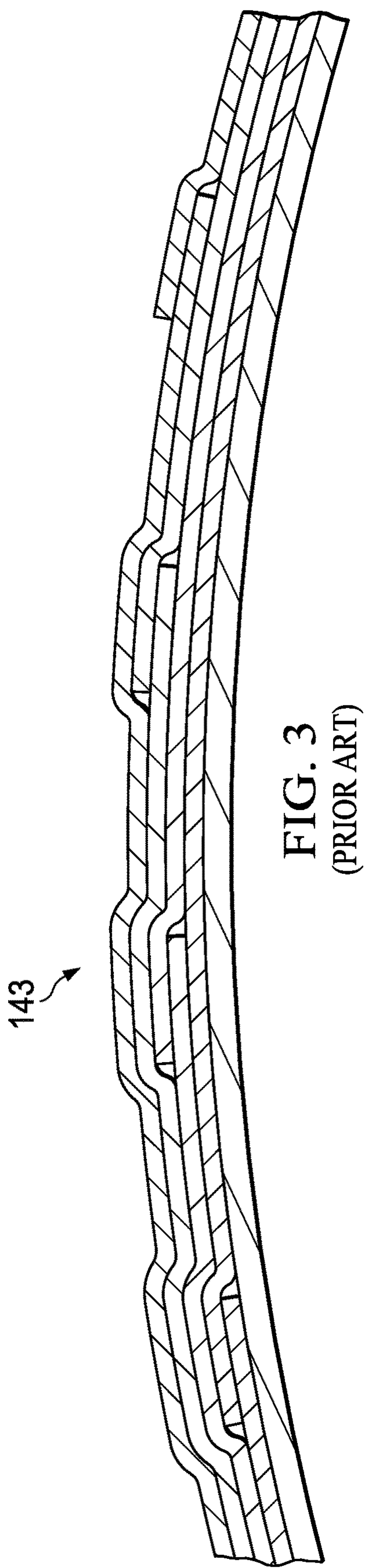
FIG. 3 is a cross-section side view of another uncured structure having a splice joint formed using a prior art method.

FIGS. 2 and 3 illustrate prior-art uncured splice joints, with FIG. 2 being an oblique cross-section side view and FIG. 3 being a cross-section side view. Prior-art splice construction is usually staged and repeated every five plies (per manufacturer guidelines), which tends to trap all fibers and limits fiber displacement during cure due to the overlapping sequence.

FIG. 2 shows a portion of an uncured structure 109, comprising two layers A, B of plies of composite prepreg laid on a tool 111. As shown, each layer typically comprises multiple parallel tapes 112 of unidirectional fibers laid adjacent one another. A tool surface 113 is shown as generally flat, though tool surface 113 may be a small portion of a larger tool having a convex shape. Base layer A comprises two plies 115, 117, and layer B comprises plies 119, 121. Plies 115, 117, 119, 121 may be, for example, unidirectional tape with longitudinal fibers extending generally perpendicularly to the view plane (0 degrees), parallel to the view plane (90 degrees), or oblique to the view plane (e.g., +/−45 degrees).

As shown, plies 115, 119 extend longitudinally from a first section, and plies 117, 121 extend longitudinally from a second section, the first and second sections being joined by the splice joint to form structure 109. Plies 115, 117, 119, 121 extend longitudinally and terminate at lateral edges, only one edge for each ply being shown. Ply 115 has edge 123, ply 117 has edge 125, ply 119 has edge 127, and ply 121 has edge 129. In the following discussion, the arrangement of plies 115, 117, 119, 121 are described, but it should be noted that the placement steps may be completed in a different but appropriate order than is presented.

To form the prior-art splice joint, ply 115 is placed on tool surface 113, and ply 119 is placed on ply 115. Edge 127 of ply 119 is spaced longitudinally from edge 123 of ply 115, so that ply 115 longitudinally extends beyond edge 127. Ply 117 is placed on tool surface 113, with longitudinal portion 131 of ply 117 overlapping onto ply 115, with edge 125 of ply 117 spaced from edge 123 of ply 115. This forms outward step 133 where ply 117 meets edge 123 and overlaps ply 115. Ply 121 is then placed over portions of plies 115, 117, 119. Outward step 135 is formed where ply 121 lays over step 133 and the stacked portions of plies 115, 117, with an inward step 137 occurring where ply 121 lays over edge 125. Another outward step 139 occurs where ply 121 meets edge 127, with longitudinal portion 141 of ply 121 overlapping onto ply 119, edge 129 being spaced from edge 127 of ply 119.

FIG. 3 shows another uncured laminated composite structure 143 with a prior-art splice joint formed in the manner described above. As mentioned above, this method of construction prevents fibers of the various plies from moving relative to each other during consolidation and curing, and this often creates wrinkles in the finished structure. In addition, the outward and inward steps produced by the overlapping arrangement may cause stress concentrations due to discontinuities formed in the fibers of the plies.

To allow for fiber movement during consolidation and curing, thereby minimizing formation of wrinkles in the structure, the plies require a contraction/expansion joint in the uncured stack of layers. The splice joint according to this disclosure consists of overlap, but instead of repeating the pattern every five plies, each layer is placed so that spaces between edges of the plies of a layer form a V-shaped pattern through the thickness of the laminate, allowing fibers of the plies to move without being trapped by an overlapping ply.

While developed for use with AFP machines for highly convergent areas (e.g., double curvature with small radius), this approach can be used with hand-laid plies. The wrinkling phenomenon is mainly due to angular deviation, and the only way to control the angular deviation of a hand-laid ply is by splicing it when the resulting angular deviation is out of the requirements. This is minimized in the AFP process, in which an operator can be controlled and distribute the angular deviation of a zone by finding a balance between isotropy and steering. Therefore, the usage of AFP allows the possibility to control each orientation (e.g., 0 deg/45 deg/−45 deg/90 deg) to minimize fiber deviation on a double-curvature shape. This control of the orientation and angular deviation allows each ply to extend far enough to create the V-shaped pattern using AFP. The use of hand-laid plies would likely require an intermediate overlap to allow manufacturing because the material would exceed its allowable angular deformation (formability).

FIGS. 4 through 10 illustrate structures and methods according to this disclosure.

Figure 4:
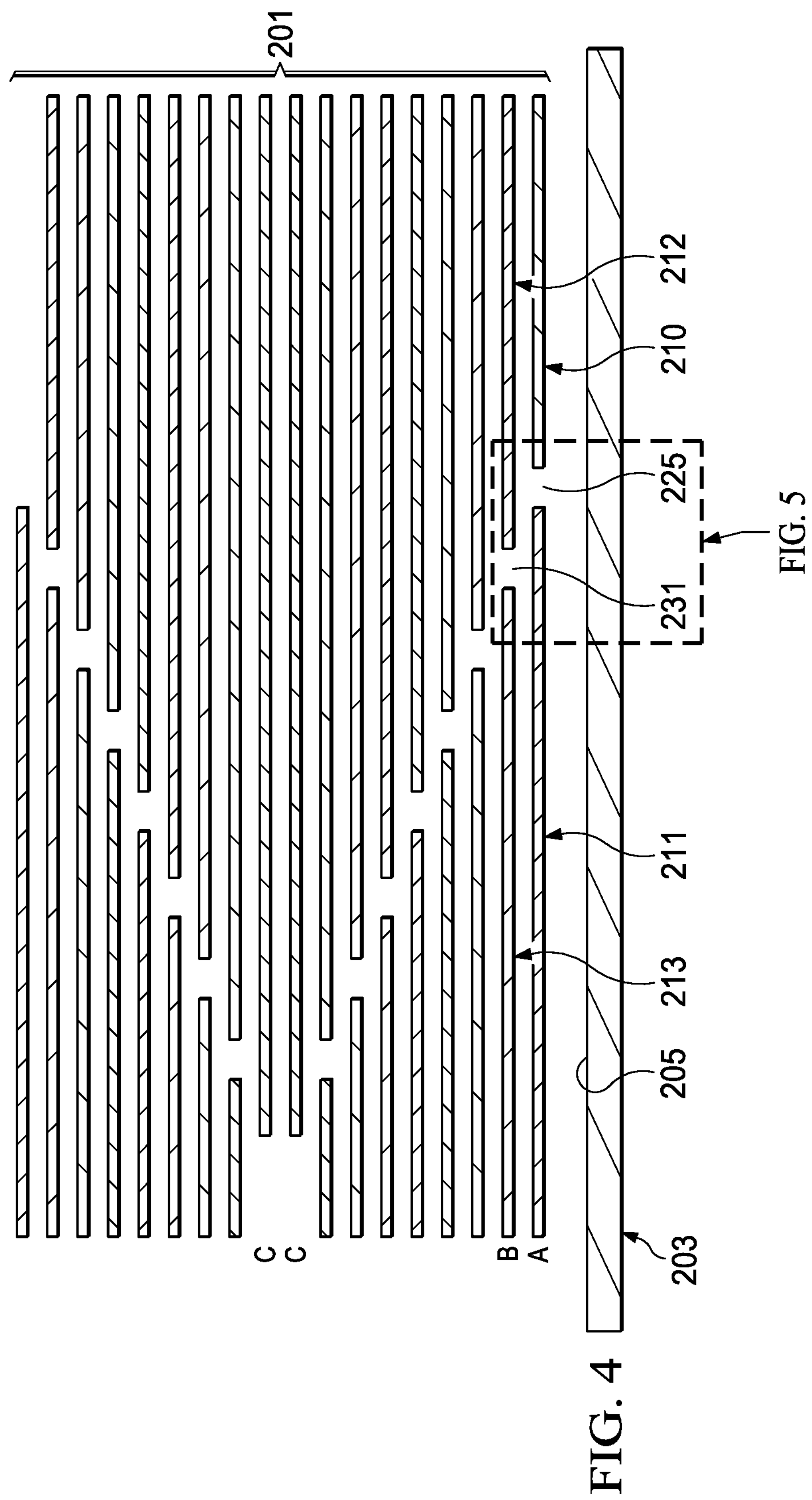
FIG. 4 is an exploded cross-section side view of a splice joint according to this disclosure.
Figure 5:
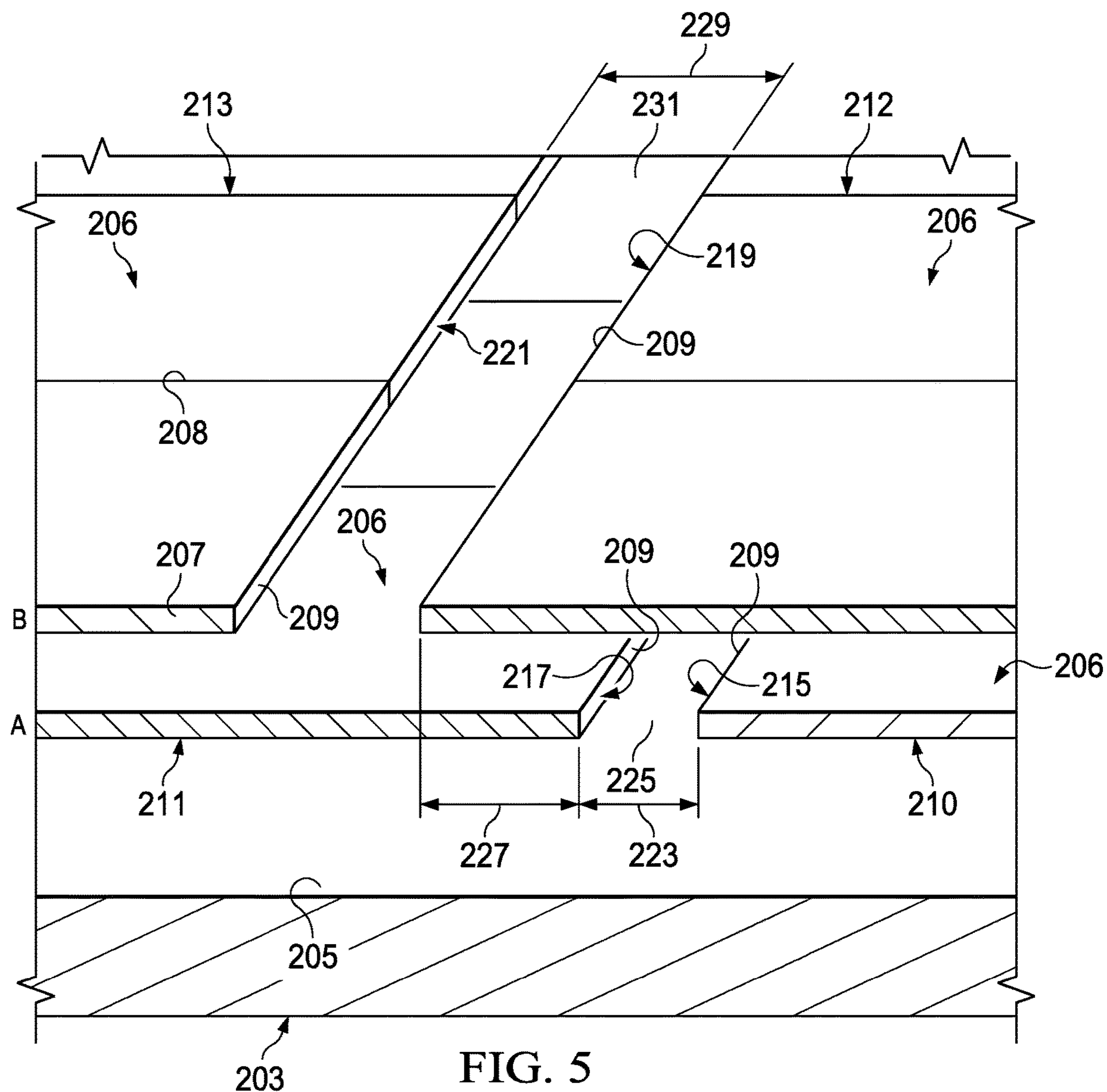
FIG. 5 is an enlarged oblique cross-section side view of a portion of the splice joint of FIG. 4.

FIG. 4 is an exploded cross-section schematic view of a splice joint in a composite laminate structure 201 formed from layers of prepreg composite plies. FIG. 5 is an enlarged detail view of the indicated portion of the splice joint of FIG. 4. Structure 201 is formed by laying plies on a tool 203, plies being laid on a tool surface 205. Though shown as generally planar, tool surface 205 may be a small portion of a larger tool and may be a portion of a convex surface. The plies are arranged in a stack, with an offset overlap pattern forming the splice joint. For this discussion, only the two innermost layers will be discussed in detail, as the remainder of structure 201 is constructed in a similar manner. It should be noted that plies of structure 201 may extend beyond the view shown in the figure.

Structure 201 comprises at least two layers A, B of plies of composite prepreg, with base layer A being laid on tool surface 205, and layer B being laid on layer A. As shown in FIG. 5, layers A, B comprise multiple parallel tapes 206 of unidirectional fibers laid adjacent one another, though it should be noted that plies of each layer A, B may be different from those in other layers A, B and may differ within a layer A, B. Each tape 206 has a pair of parallel longitudinal edges 207, 208 and an end edge 209 (only one shown) at each end of each tape 206. Layer A comprises two plies 210, 211, and layer B comprises plies 212, 213. In the embodiment shown, plies 210, 211, 212, 213 are unidirectional tape having fibers extending parallel to the view plane (0 degrees), though other embodiments will have fibers generally perpendicular to the view plane (90 degrees) or oblique to the view plane (e.g., +/−45 degrees).

Tapes 206 within plies 210, 212 extend longitudinally from a first section, and tapes 206 of plies 211, 213 extend longitudinally from a second section, the first and second sections being joined by the splice joint to form structure 201. In the embodiment shown, end edges 209 of tapes 206 of each ply 210, 211, 212, 213 form a gap edge for each ply 210, 211, 212, 213. Ply 210 has gap edge 215, ply 211 has gap edge 217, ply 212 has gap edge 219, and ply 213 has gap edge 221. Plies 210, 211 are laid on tool surface 205 in locations that place edge 215 of ply 210 a selected contraction distance 223 from edge 217 of ply 211 to form contraction gap 225. Plies 212, 213 are then laid on plies 210, 211 in locations that place edge 219 of ply 212 over ply 211, such that edge 219 is a selected splice distance 227 beyond edge 217 of ply 211. In this manner, ply 212 overlaps ply 211 by splice distance 227. Edge 221 of ply 213 is a selected contraction distance 229 (which may be equal or unequal to distance 223) from edge 219 of ply 212 to form contraction gap 231. As shown in FIG. 4, additional layers may be added on top of layers A, B, to form a desired thickness of structure 201. It is preferable that two center layers C be located at the mid-thickness of structure 201 for creating a symmetric stack of layers, wherein one side of the V-shaped overlap arrangement is formed on each side of center layers C.

Splice distance 227 may be an overlap distance determined by the ply manufacturer to achieve the desired minimum strength of structure 201 after curing. However, contraction distances 223, 229 will be selected based on the calculated or expected amount that fibers of layers A, B will move toward tool surface 205 during consolidation and curing. For example, on a convex tool surface 205, loss of thickness in plies 210, 211, 212, 213 will cause their fibers to move radially inward toward tool 203, and this will allow fibers of plies 210, 211 to move toward each other in gap 225 and fibers of plies 212, 213 to move toward each other in gap 231. In the ideal configuration, contraction distances 223, 229 are selected to allow adjacent gap edges 215, 217 to butt together and for adjacent gap edges 219, 221 to butt together, but without causing wrinkles to form in either layer A, B. The contraction distance between plies of a layer will typically increase as the radial distance from tool 203 increases for outer layers.

Figure 6:
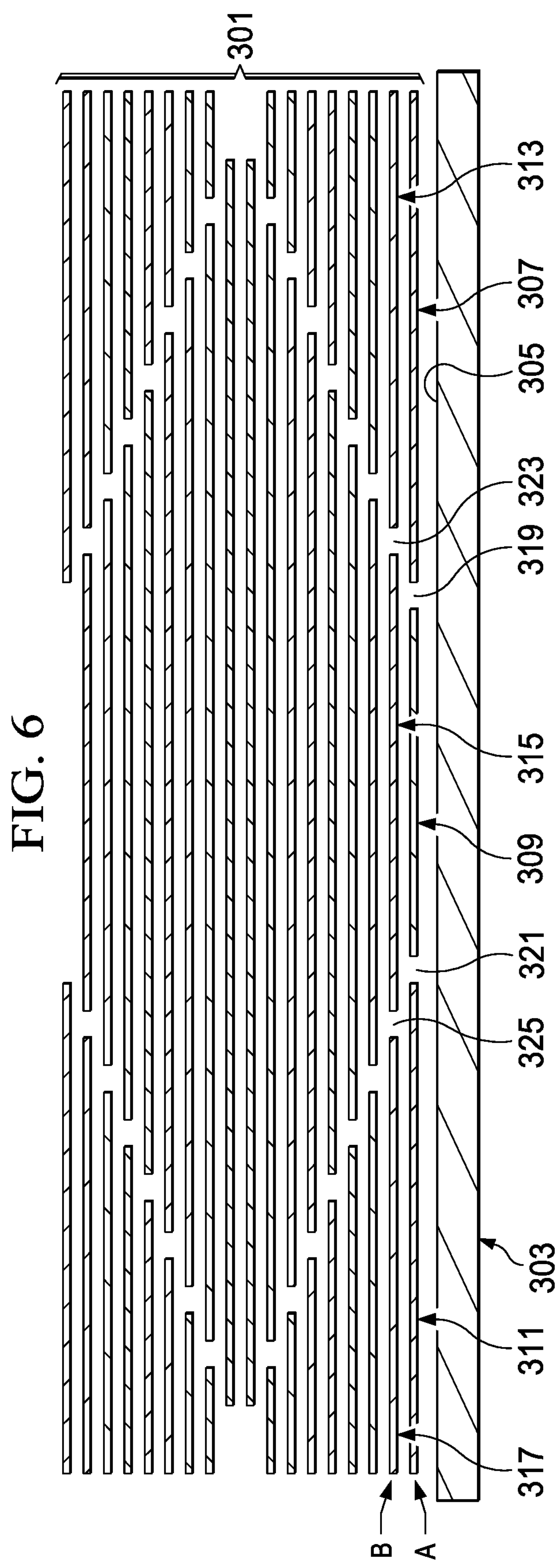
FIG. 6 is an exploded cross-section side view of another embodiment of a splice joint according to this disclosure.

FIG. 6 is an exploded cross-section view of an embodiment of a structure 301 having two splice joints according to this disclosure. Like structure 201, structure 301 is formed from layers of prepreg composite plies laid on a tool 303, plies being laid on a tool surface 305. Though shown as generally planar, tool surface 305 may be a small portion of a larger tool and may be a portion of a convex surface. The plies are arranged in a stack, with an offset overlap pattern forming the splice joints. It should be noted that plies of structure 301 may extend beyond the view shown in the figure. Plies 307, 309, 311 form layer A, and plies 313, 315, 317 for layer B. Longitudinal portions of ply 315 overlap longitudinal portions of plies 307, 311 by a selected splice distance, whereas plies within layers A, B are spaced from each other at their adjacent gap edges by contraction gaps 319, 321, 323, 325. As described above for structure 201, the contraction distances defining gaps 319, 321, 323, 325 are selected to allow the fibers of each ply 307, 309, 311, 313, 315, 317 to move toward the fibers of an adjacent ply 307, 309, 311, 313, 315, 317 in a layer A, B as plies are consolidated and cured. In this manner, contraction gaps 319, 321, 323, 325 allow fibers to move close to each other or into contact during consolidation and curing without causing wrinkling of layers A, B.

Figure 7:
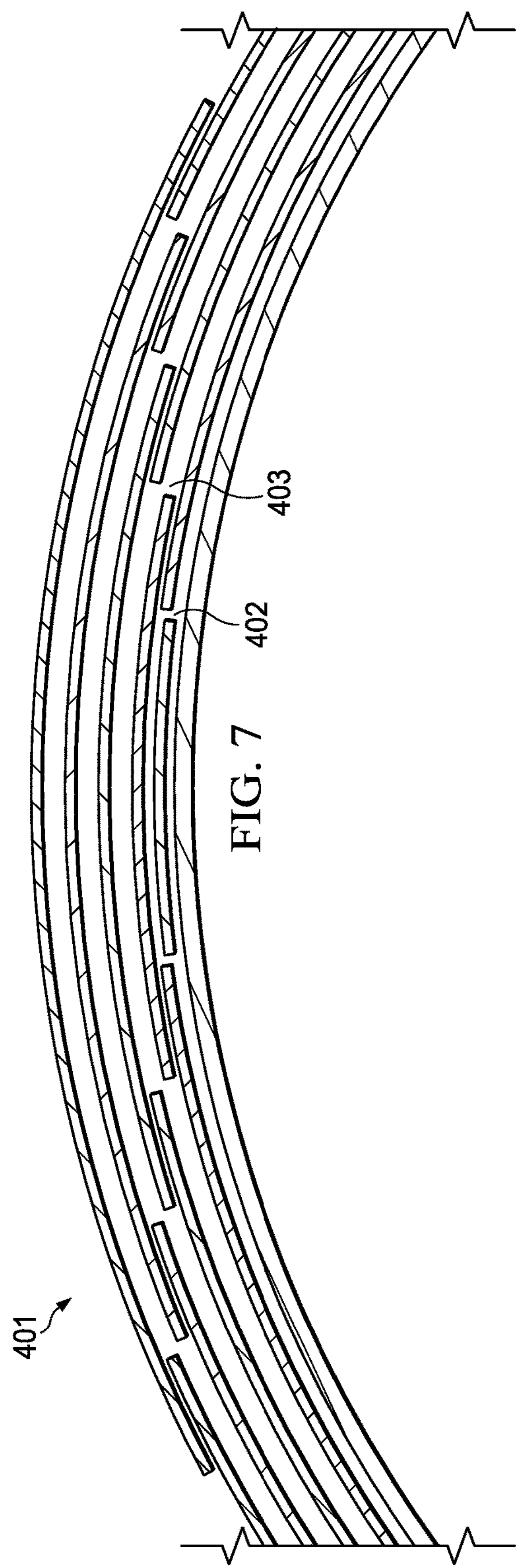
FIG. 7 is a cross-section side view of an uncured splice joint according to this disclosure.
Figure 8:
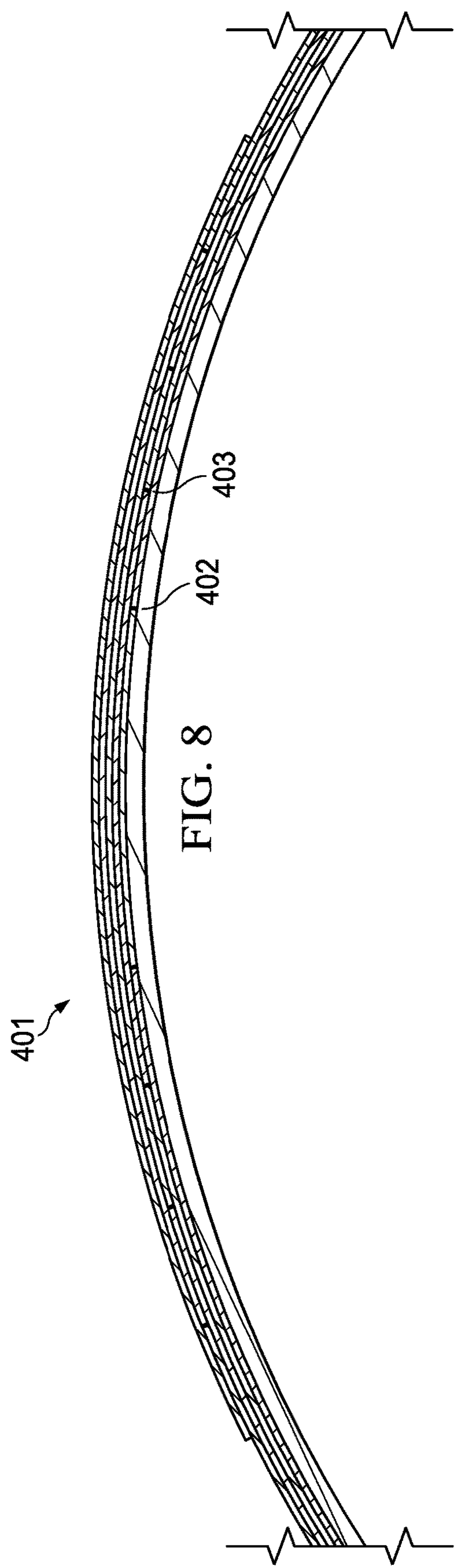
FIG. 8 is a cross-section side view of the splice joint of FIG. 7 after curing.
Figure 9:
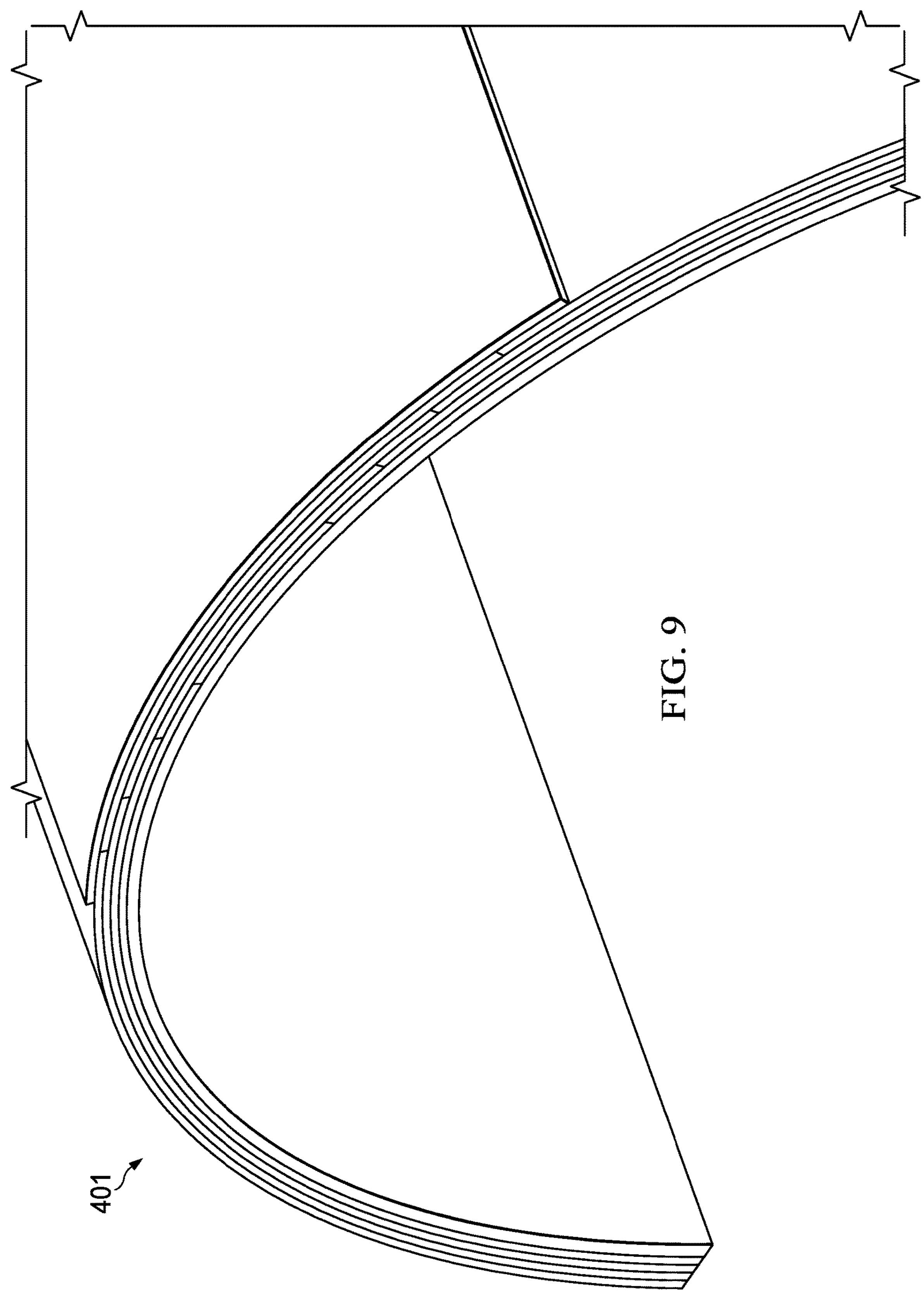
FIG. 9 is an oblique view of a section of a cured structure with a splice joint according to this disclosure.

FIGS. 7 through 9 illustrate what occurs during consolidation and curing of a structure having splice joints like structures 201, 301 and according to this disclosure.

FIG. 7 is a cross-section view of an uncured structure 401 having two splice joints, as described above. Contraction gaps, such as gaps 402, 403, are located in each layer of composite plies, and the plies are shown spaced from each other to indicate their uncured thickness. FIG. 8 is a cross-section view of structure 401 of FIG. 7 after curing, and in which gaps 402, 403 are almost or completely closed as the thickness of the plies decreases during consolidation and curing. FIG. 9 is an oblique cross-section view of a section of cured structure 401. As visible in the figures, structure 401 after curing has layers of plies that lack the abrupt steps at overlap locations, such as those formed when using the prior-art methods for forming splice joints.

Figure 10:
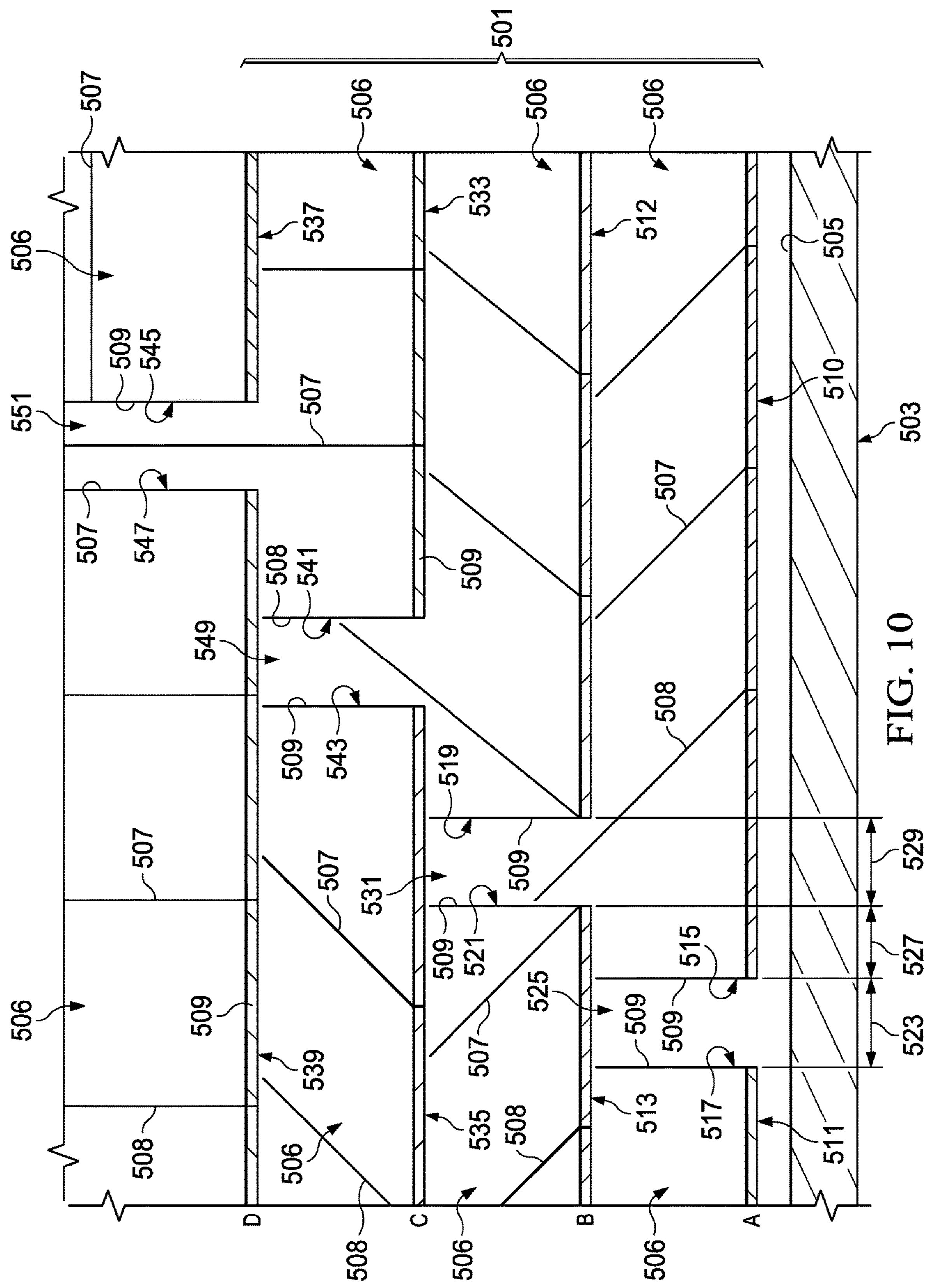
FIG. 10 is an exploded oblique cross-section side view of another embodiment of a splice joint according to this disclosure.

FIG. 10 is an exploded cross-section side view of another splice joint according to this disclosure and used in a composite laminate structure 501 formed from layers of prepreg composite plies. Structure 501 is formed by laying plies on a tool 503, plies being laid on a tool surface 505. Though shown as generally planar, tool surface 505 may be a small portion of a larger tool and may be a portion of a convex surface. The plies are arranged in a stack, with an offset overlap pattern forming the splice joint. For this discussion, only the four innermost layers will be discussed in detail, as the remainder of structure 501 is constructed in a similar manner. It should be noted that plies of structure 501 may extend beyond the view shown in the figure.

In the embodiment shown, structure 501 comprises at least four layers A, B, C, D of plies of composite prepreg, with base layer A being laid on tool surface 505, layer B being laid on layer A, layer C being laid on layer B, and layer D being laid on layer C. As shown, layers A, B, C, D comprise multiple tapes 506 of unidirectional fibers laid adjacent and parallel to one another within portions of each layer A, B, C, D, though it should be noted that plies of each layer A, B, C, D may be different from those in other layers A, B, C, D and may differ within a layer A, B, C, D. Each tape 506 has a pair of parallel longitudinal edges 507, 508 and an end edge 509 (only one shown) at each end of each tape 506.

Layer A comprises two plies 510, 511, layer B comprises plies 512, 513, layer C comprises plies 533, 535, and layer D comprises plies 537, 539. In the embodiment shown, plies 511, 537 are formed from tapes 506 having fibers extending parallel to the view plane (0 degrees), plies 510, 512, 513, 535 are formed from tapes 506 having fibers extending oblique to the view plane (e.g., +/−45 degrees), and plies 533, 539 are formed from tapes 506 having fibers extending generally perpendicularly to the view plane (90 degrees). With this configuration, plies overlap onto plies having an identical fiber orientation, allowing for easier movement of the fibers of each overlapped ply during consolidation and curing. Tapes 506 within plies 510, 512, 533, 537 extend from a first section, and tapes 506 of plies 511, 513, 535, 539 extend from a second section, the first and second sections being joined by the splice joint to form structure 501.

In the embodiment shown, end edges 509 of tapes 506 of plies 510, 512, 513, 535 are oblique to longitudinal edges 507, 508 and form gap edge 515, 519, 521, 543, respectively. End edges 509 of tapes 506 of plies 511, 537 are generally perpendicular to longitudinal edges 507, 508 and form gap edges 517, 545, respectively.

To form the splice joint, plies 510, 511 are laid on tool surface 505 in locations that place edge 515 of ply 510 a selected contraction distance 523 from edge 517 of ply 511 to form contraction gap 525. Plies 512, 513 are then laid on plies 510, 511 in locations that place edge 521 of ply 513 over ply 510, such that edge 521 is a selected splice distance 527 beyond edge 515 of ply 510. In this manner, ply 513 overlaps ply 510 by splice distance 527 with fibers oriented in the same direction in both plies. Edge 519 of ply 512 is a selected contraction distance 529 (which may be equal or unequal to distance 523) from edge 521 of ply 513 to form contraction gap 531. As shown in the figure, plies 533, 535 of layer C and plies 537, 539 of layer D are added on top of layers A, B in the same overlapping manner to form contraction gaps 549, 551, with all overlapping plies having the same fiber orientation as the overlapped plies. Additional layers may be added to form a desired thickness of structure 501.

As with the embodiments described above, it is preferable that two center layers be located at the mid-thickness of structure 501 for creating a symmetric stack of layers, wherein one side of the V-shaped overlap arrangement is formed on each side of center layers. Also, splice distances (overlap) may be determined by the ply manufacturer to achieve the desired minimum strength of structure 501 after curing, but contraction distances will be selected based on the calculated or expected amount that fibers of layers A, B, C, D will move toward tool surface 505 during consolidation and curing.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A method for forming a composite structure of first and second sections joined by a splice joint, each section being formed from uncured layers of plies of composite material, each ply being formed from fibers and a volume of uncured matrix material and having a gap edge, the method comprising:

(a) placing a first ply of the first section on a convex surface of a tool;

(b) placing a first ply of the second section on the surface of the tool, a gap edge of the first ply of the second section being spaced by a selected first contraction distance from and generally parallel to a gap edge of the first ply of the first section, the first plies forming a first layer;

(c) placing a second ply of the first section on the first ply of the first section, a gap edge of the second ply of the first section being spaced by a selected splice distance plus a selected second contraction distance from the gap edge of the first ply of the first section;

(d) placing a second ply of the second section on the first ply of the second section, a gap edge of the second ply of the second section being spaced by the selected second contraction distance from and generally parallel to the gap edge of the second ply of the first section, a portion of the second ply of the second section overlapping the first ply of the first section by the splice distance, the second plies forming a second layer, the first and second layers forming a splice joint;

(e) consolidating the layers and curing the matrix material, thereby causing contraction of the layers toward the tool, the first and second contraction distances being selected so that adjacent gap edges of the plies of each layer are in close proximity or in contact after moving toward each other during the contraction, the second contraction distance being larger than the first contraction distance.

2. The method of claim 1, further comprising:

repeating steps (c) and (d) to place additional layers prior to step (e), a contraction distance for each additional layer being larger than a contraction distance in an adjacent previous layer.

3. The method of claim 1, further comprising:

repeating steps (c) and (d) to place additional layers prior to step (e), a contraction distance for each additional layer being larger than a contraction distance in an adjacent previous layer, the additional layers being arranged to form a stack of layers symmetric about a thickness of the stack.

4. The method of claim 1, further comprising:

forming a second splice joint in the layers to join a third section to the first and second sections.

5. The method of claim 1, wherein the tool has a closed shape.

6. The method of claim 1, wherein the tool has an open shape.

7. The method of claim 1, wherein the plies are formed from unidirectional fibers.

8. The method of claim 1, wherein the plies are formed from unidirectional fibers, and steps (c) and (d) comprise orienting the fibers of the second layer at an angle to the fibers of the first layer.

9. The method of claim 1, wherein the fibers of the first ply of the first section and of the second ply of the second section are oriented in the same direction.

10. The method of claim 1, wherein the gap edges of the second plies are generally parallel to the gap edges of the first plies.

11. The method of claim 1, further comprising:

repeating steps (c) and (d) to place additional layers prior to step (e), the additional layers being arranged so that gaps formed between gap edges of each layer form a V-shaped pattern through the thickness of the structure.

12. A method for forming a closed-shape composite structure of first and second sections joined by a splice joint, each section being formed from uncured layers of plies of composite material, each ply being formed from fibers and a volume of uncured matrix material and having a gap edge, the method comprising:

(a) forming a first layer by placing a first ply of each of the first and second sections on a convex surface of a mandrel, gap edges of the first plies being spaced by a selected first contraction distance from each other, thereby forming a gap between the gap edges of the first plies;

(b) placing a second ply of the first section on the first ply of the first section, a gap edge of the second ply of the first section being spaced by a selected splice distance plus a selected second contraction distance from the gap edge of the first ply of the first section;

(c) placing a second ply of the second section on the first ply of the second section, a gap edge of the second ply of the second section being spaced by the selected second contraction distance from and generally parallel to the gap edge of the second ply of the first section, thereby forming a gap between the gap edges of the second plies, a portion of the second ply of the second section overlapping the first ply of the first section by the splice distance, the second plies forming a second layer, the first and second layers forming a splice joint;

(d) consolidating the layers and curing the matrix material, thereby causing contraction of the layers toward the mandrel, the first and second contraction distances being selected so that adjacent gap edges of the plies of each layer are in close proximity or in contact after moving toward each other during the contraction, the second contraction distance being larger than the first contraction distance.

13. The method of claim 12, further comprising:

repeating steps (b) and (c) to place additional layers prior to step (d), a contraction distance for each additional layer being larger than a contraction distance in an adjacent previous layer.

14. The method of claim 12, further comprising:

repeating steps (b) and (c) to place additional layers prior to step (d), a contraction distance for each additional layer being larger than a contraction distance in an adjacent previous layer, the additional layers being arranged to form a stack of layers symmetric about a thickness of the stack.

15. The method of claim 12, further comprising:

repeating steps (b) and (c) to place additional layers prior to step (d), a contraction distance for each additional layer being larger than a contraction distance in an adjacent previous layer, the additional layers being arranged so that the gaps form a V-shaped pattern through the thickness of the structure.

16. The method of claim 12, further comprising:

forming a second splice joint in the layers to join a third section to the first and second sections.

17. The method of claim 12, wherein the plies are formed from unidirectional fibers.

18. The method of claim 12, wherein the plies are formed from unidirectional fibers, and steps (b) and (c) comprise orienting the fibers of the second layer at an angle to the fibers of the first layer.

19. The method of claim 12, wherein the fibers of the first ply of the first section and of the second ply of the second section are oriented in the same direction.

20. The method of claim 12, wherein the gap edges of the second plies are generally parallel to the gap edges of the first plies.

* * * * *